3,303,421
DIGITAL PHASE COMPARISON CHECKING CIRCUIT
Leroy U. C. Kelling, Waynesboro, Va., assignor to General Electric Company, a corporation of New York
Filed Jan. 23, 1963, Ser. No. 253,310
3 Claims. (Cl. 324—83)

The invention relates to a checking circuit, and particularly to a circuit for checking the relative phase or time variations of two or more signals such as in a numerical control system.

In a numerical control system for either positioning or contouring an object, input data from a source such as punched tape is applied to command phase generators which convert this data to signals that vary at a time determined by the data characteristics. The signals from the command phase generators are applied to a comparison circuit along with signals from a position feedback device that vary at a time determined by the feedback device. The comparison circuit compares the command phase generator signals and the position feedback signals to produce an error signal indicative of the time differences (hence phase relation) between the command and feedback signals. This error signal is applied to a servo device that positions or moves the object in accordance with the input data. Since the command phase generator signals are compared with the position feedback signals on the basis of their relative time variations or phases, it is desirable that the command phase generator signals, as produced by the system, be accurate and precise. If the command phase generator signals have any error, this error will result in an erroneous object motion or position. In a machine tool, such an error can result in work that is the wrong size, shape, or dimension.

Accordingly, an object of the invention is to provide an improved circuit that checks the relative time or phase variations of two or more signals.

A more specific object of the invention is to provide an improved circuit for checking command signals generated in a numerical control system to detect any error in the time variations of such command signals.

Briefly, the checking circuit of the invention compares the phase or time variations of a first signal with the phase or time variation of an inverted second signal and produces an error signal if the two phase or time variations do not coincide. The checking circuit also compares the phase or time variations of an inverted first signal with the phase or time variations of the second signal and produces an error signal if the two phase or time variations do not coincide. The comparisons of a first signal with the inverted second signal, and the comparison of the second signal with the inverted first signal provide a double check of the two signals, and enables an error to be detected and indicated if there is any difference in the phase or time variations. It will be appreciated that more than two comparisons may be made on the basis of first and second signals, first and third signals, or on any other basis using one or more of the signals as the common comparison signal.

The invention is particularly pointed out in the claims. The invention, its structure, its operation, and further objects and advantages may be better understood by reference to the following description taken in connection with the accompanying drawing, in which:

In the specification, a brief description will be given of a numerical control system in which the checking circuit of the invention can be used. Next, a brief explanation of the logic circuits used in the checking circuit will be given. Finally, the checking circuit will be described and its operation will be explained.

*Numerical control system*

Figure 1:
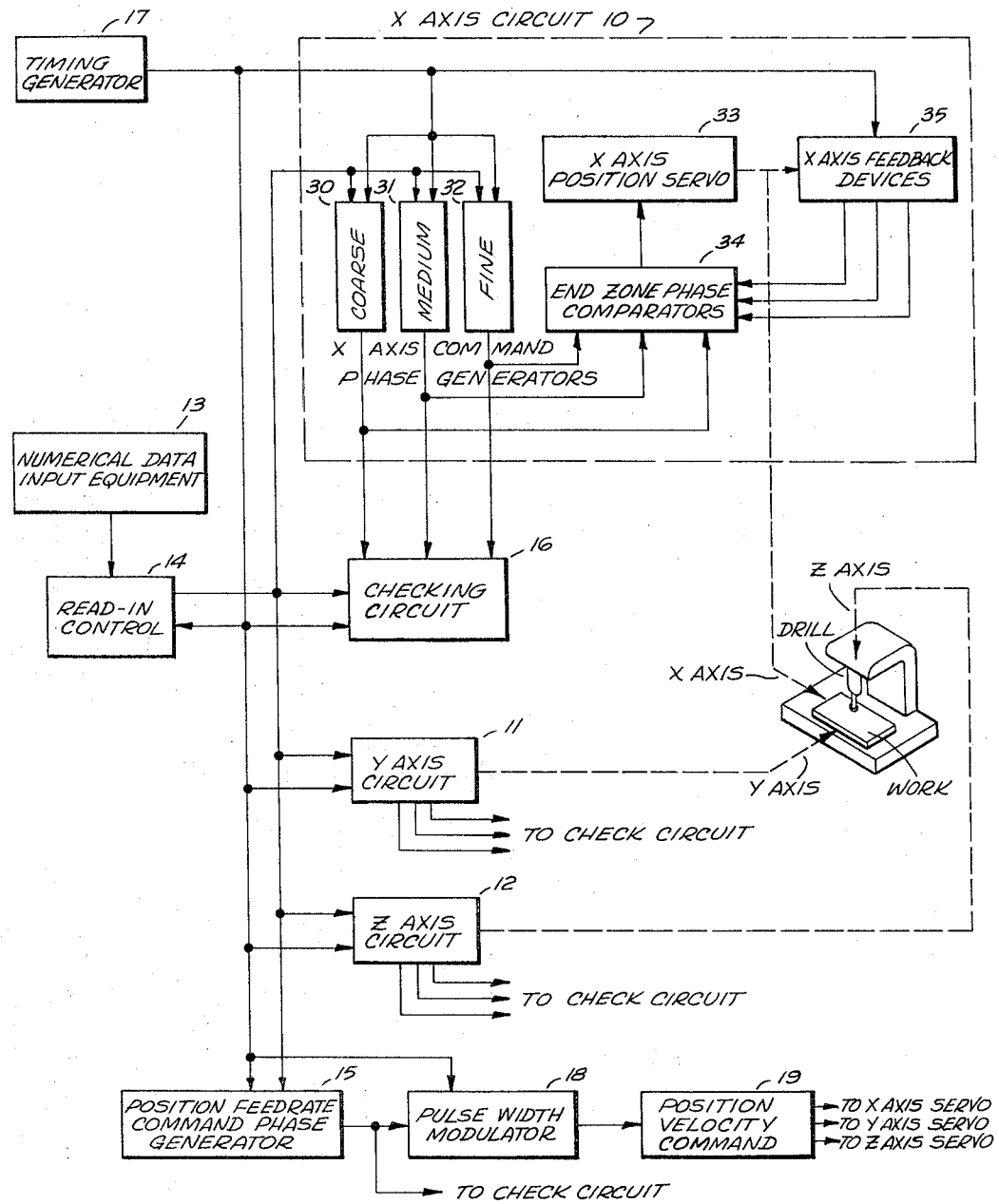
FIGURE 1 shows a block diagram of a numerical control system in which the checking circuit of the invention may be used.

While the checking circuit of the invention was designed for and has been used with a numerical control system such as shown in FIGURE 1, the checking circuit can be used to check the phase or time variations of other signals. The numerical control system of FIGURE 1 is known in the art, a more detailed description being given in a copending application of Leroy U. C. Kelling entitled, "Data Conversion System," filed November 21, 1962, Serial No. 239,145. The numerical control system of FIGURE 1 moves work along X and Y axes, and moves with a drill along a Z axis, the three axes usually being perpendicular to each other. The control system includes an X axis circuit 10, a Y axis circuit 11, and a Z axis circuit 12 whose mechanical outputs are indicated by dashed lines leading to the work and drill. The X axis circuit 10 is enclosed by dashed lines which include further detailed block diagrams of the X axis circuit. Since the Y axis and Z axis circuits 11, 12 contain similar or equivalent block diagrams, these circuits 11, 12 are not shown in the same detail as the X axis circuit 10. Additional functions can also be provided. Operation or movement of the work and the drill is controlled by numerical data input equipment 13. This equipment 13 provides numerical data representative of the desired position or motion of the work relative to the drill, and further representative of the desired motion of the drill. This data is applied to a read-in control 14 whose output is applied to the X, Y, and Z axis circuits 10, 11, 12, to a position feed rate command phase generator 15, and to the checking circuit 16. A timing generator 17 provides timing or clock signals to various circuits in the system including the X, Y, and Z axis circuits 10, 11, 12, the read-in control 14, the position feed rate command phase generator 15, and the checking circuit 16. The generator 17 preferably produces square wave pulses having a frequency of say 250 kilocycles, this being a period of 4 microseconds per cycle. These pulses provide the carrier by which command signals are transported throughout the control system.

In the X axis circuit 10 (and therefore in the Y and Z axis circuits 11, 12 also), pulses from the timing generator 17 and data from the read-in control 14 are applied to coarse, medium, and fine X axis command phase generators 30, 31, 32. These generators produce command signals having coarse, medium, and fine resolution. These command signals vary between two values at a time with respect to the timing generator signals that is determined by the numerical data being applied. Thus, the phase of these signals, or the time of their variations, indicates the commanded signal. These coarse, medium, and fine signals are applied to end zone phase comparators 34 which compare the coarse, medium, and fine command signals with respective or corresponding coarse, medium, and fine feedback signals which are produced by X axis feedback devices 35. The feedback signals have a similar time variation or phase which indicates the position of the work in coarse, medium, and fine increments along the X axis. The comparators 34 produce error signals which are applied to an X axis position servo 33. The mechanical output of this servo 33 is indicated by dashed lines, and is applied to the feedback devices 35 and also to the work. The position servo 33 moves the feedback devices 35 and the work in a direction called for by the error signal produced by the comparators 34. As the feedback devices 35 and the work are moved, they will eventually reach a point at which the feedback devices 35 produce signals which have the same time variation or phase as the command phase generator signals so that no further error signal is produced. At this time, motion of the work along the X axis stops. If the system is functioning properly, the work will be positioned along the X axis at the desired commanded position.

Positioning or movement along the Y axis and Z axis is accomplished in the same or similar manner. Therefore, no further explanation will be given for these axes.

The system may move the work at a velocity commanded by the numerical data input equipment 13. This is achieved by the position feed rate command phase generator 15 which produces feed rate signals similar to those produced by the X axis command phase generators 30, 31, 32. The feed rate signals are applied to a pulse width modulator 18. The ouput from the modulator 18 is applied to a position velocity command 19 which resolves the applied signal into X, Y, and Z axis signals for controlling the velocity permitted by the X, Y, and Z axis servos.

The signals to be checked in the numerical control system of FIGURE 1 are the signals from the X axis command phase generators 30, 31, 32, from the comparable Y and Z axis command phase generators, and from the position feed rate command phase generator 15. These signals are applied to the checking circuit 16 as indicated.

*Logic background*

The checking circuit of the invention utilizes digital techniques which include logic circuits of known elements or building blocks. There are many publications describing such elements, one such publication being a book entitled, "Design of Transistorized Circuits for Digital Computers," by A. I. Pressman, John F. Ryder Publisher, Inc., New York, 1960. This book discloses a number of actual circuits for accomplishing the various logic functions including gates and flip-flops. Persons skilled in the art will, after an explanation of the symbols shown, appreciate that many different actual circuits may be utilized to provide the respective functions indicated by the symbols. In the subsequent explanation, two logic terms will be used, these being logic 1 and logic 0. For this explanation, a logic 1 is provided by zero volts, and a logic 0 is provided by plus six volts.

Figure 2:
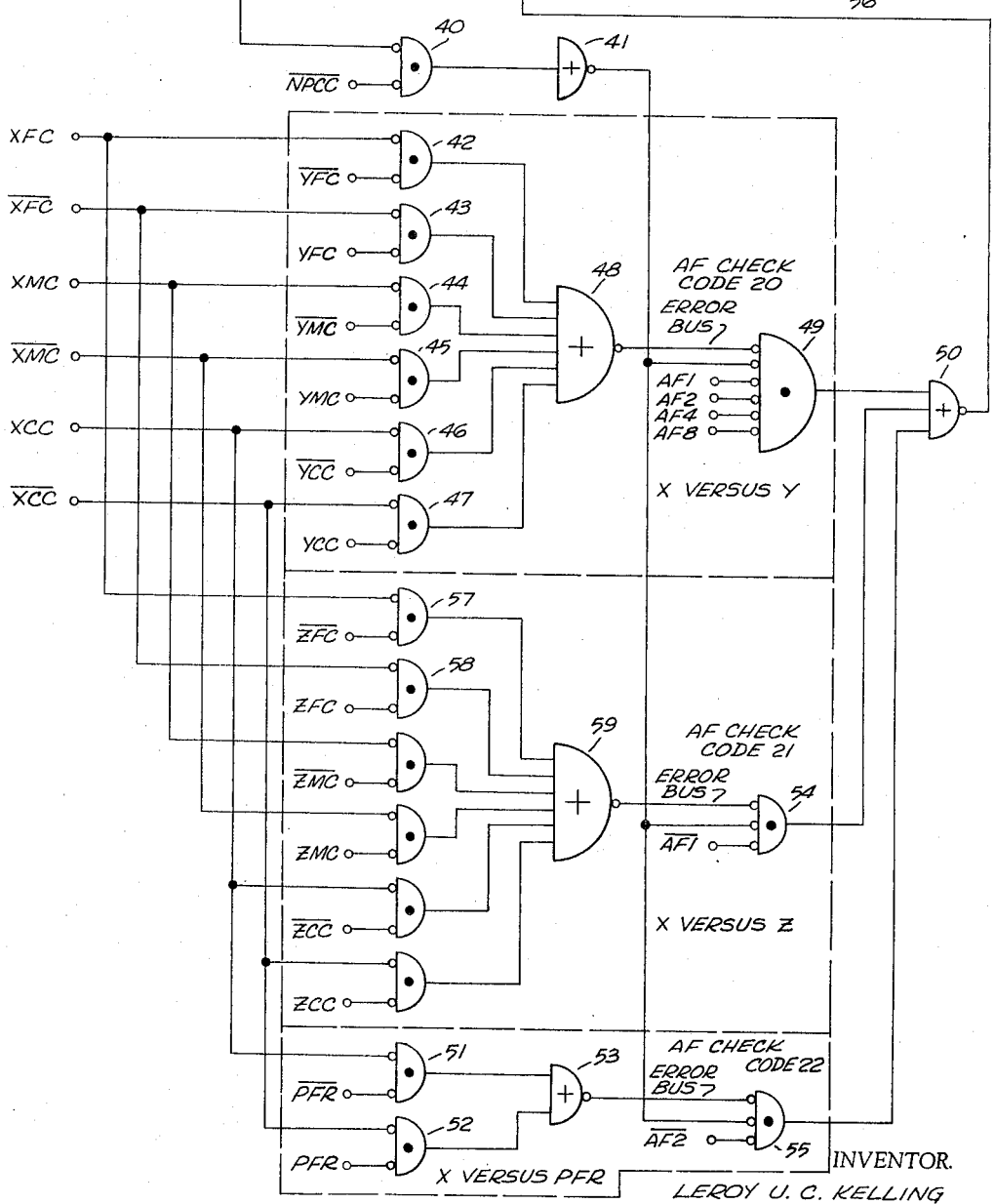
FIGURE 2 shows a schematic diagram of one embodiment of the checking circuit in accordance with the invention.

In FIGURE 2, one frequently used logic symbol is a multiple (two) input NOT AND gate 40 (i.e., an AND gate with inversion at each of its inputs). In this application, as is known to those skilled in the art, this gate 40 is sometimes called a NOR gate. In logic terms, the gate 40 produces a logic 0 at its output if any one of its inputs is at a logic 1. FIGURE 2 also shows a three input NOR gate 54 and a six input NOR gate 49. These gates 54, 49 also produce a logic 0 at their outputs if any one of their inputs is at a logic 1. A two input OR NOT gate 53 (i.e., an OR gate with inversion at its output) is also shown in FIGURE 2. This gate 53 is also referred to as a NOR gate. In logic terms, the gate 53 produces a logic 0 at its output if any one of its inputs is at a logic 1. FIGURE 2 also shows a six input NOR gate 48. The NOT AND and the OR NOT gates exemplified above are functionally, and may be structurally, the same. The two types of gates are shown to assist persons in applying their logic understanding to the circuit. FIGURE 2 also shows an inverter 41. The purposes of this inverter 41 is simply to reverse the logic of an applied signal. If a logic 1 is applied to the input of the inverter 41, a logic 0 is produced at its output; and if a logic 0 is applied to the input of the inverter 41, a logic 1 is produced at its output.

FIGURE 2 also shows two steered flip-flops, one being the check time active-FF. These flip-flops have their terminals labeled to assist in this explanation. Outputs from the flip-flops are taken from the terminals 1 and 0. When the flip-flop is set, it is in the one state with terminal 1 at a logic 1 and terminal 0 at a logic 0. When the flip-flop is reset, it is in the zero state with terminal 1 at a logic 0 and terminal 0 at a logic 1. The flip-flop may be controlled by a number of inputs which include: a set input SI, a reset input RI, a set steering input SS, a reset steering input RS, a set trigger input ST, and a reset trigger input RT. A logic 1 applied to the set or reset inputs SI or RI sets or resets the flip-flop respectively for the duration of the logic 1, and subsequently if no further signals are applied to the flip-flop. A logic 0 at the set or reset steering input SS or RS for a predetermined time prior to a trigger pulse steers the flip-flop, and permits the flip-flop to be set or reset by a trigger pulse change from a logic 1 to a logic 0 at either the set trigger input ST or the reset trigger input RT respectively. The flip-flop remains so set or reset after removal of these signals and until further signals are applied. In the particular application of the flip-flops in FIGURE 2, all of the flip-flop terminals are not needed or used.

FIGURE 2 shows a number of legends having a combination of letters or a combination of letters and numbers. Some of these legends have a line above them. For example, the legend XFC and the legend $\overline{XFC}$ appear. The purpose of the line above such a legend is to indicate that the signal designated by the legend is inverted in its logic. Thus, the legend XFC stands for the X fine command. The legend $\overline{XFC}$ stands for the X fine command inverted. Thus, when the X fine command is at a logic 1, its inversion is at a logic 0. When the X fine command is at a logic 0, its inversion is at a logic 1.

*Checking circuit—Description*

The checking circuit of the invention checks the time variation of signals (hence their phase) by a comparison of the time variation of a first signal with the time variation of the inversion of a second signal, and by a comparison of the time variation of the inversion of the first signal with the time variation of the second signal. For the numerical control system shown in FIGURE 1, this is done by a comparison of the X command signals and the Y command signals, by a comparison of the X command signals and the Z command signals, and by a comparison of the X command signals with the position feed rate (PFR) signals. These comparisons are made in response to check codes (provided by the numerical data input equipment) having predetermined numbers. If any one of these comparisons produces an error, at any point in the comparison, an error signal is produced. In FIGURE 2, these comparisons are respectively made by three groups of gates set off by dashed lines for X versus Y, X versus Z comparison, and X versus PFR. In FIGURE 2, the legends are coded with X, Y, or Z followed by F, M, or C for fine, medium, or coarse, followed by the letter C for command. In addition, the position feed rate signal from the generator 15 of FIGURE 1 is indicated by the legend PFR. The legend AF means auxiliary function, and the number following this legend indicates the number needed to produce the auxiliary function. Finally, the legend NPCC stands for numerical positioning check command signal.

In the X versus Y comparison section, it will be seen that combinations of the X fine, medium, and coarse command signals and their inversions, and the Y fine, medium, and coarse command signals and their inversions are respectively applied to the gates 42–47. Specifically, the X fine command signal and the inverted Y fine command signal are applied to the gate 42, the inverted X fine command signal and the Y fine command signal are applied to the gate 43, the X medium command signal and the inverted Y medium command signal are applied to the gate 44, the inverted X medium command signal and the Y medium command signal are applied to the gate 45, the X coarse command signal and the inverted Y coarse command signal are applied to the gate 46, and the inverted X coarse command signal and the Y coarse command signal are applied to the gate 47. The outputs of these gates 42–47 are applied to the six input gate 48. The output of this gate 48 is applied to an X versus Y error bus which is coupled to the six input gate 49. The second input of this gate 49 is derived from the check time active flip-flop. The check time active flip-flop is set by a discriminator blanking signal when the checking circuit is to be active or used. The check time active flip-flop provides itself with set and reset steering from its one and zero terminals respectively. The zero terminal of the check time active flip-flop is applied to the gate 40 along with the numerical positioning check command signal. When the check time active flip-flop is set, its zero terminal supplies a logic 0 to the gate 40 along with the logic 0 from the numerical positioning check command to produce a logic 1 which is inverted by the inverter 41. This logic 1 is inverted to a logic 0 on the code 20 bus and makes the gates 49, 54, 55 permissive as far as the code 20 bus is concerned. The output of the gate 40 is inverted by the inverter 41 and applied to the code 20 bus. This code 20 bus is at a logic 0 if the proper check code (a ten value of 2) has been applied to the system. As will be explained further, the check codes contemplated were the numbers 20, 21, or 22 for the various comparisons. The other four inputs to the gate 49 are derived from the auxiliary function generator flip-flops having unit values of 1, 2, 4, and 8. For a check code of 20, all these flip-flops should be reset so that the signals on their output terminals are all logic 0.

In the X versus Z comparison, the check code 21 requires that the auxiliary function flip-flop 1 having a unit value of 1 should be set. The inversion of this signal on the output terminal of this flip-flop is a logic 0. In the X versus PFR comparison, the check code 22 requires that the auxiliary flip-flop having a unit value of 2 be set so that the inversion of the signal on the output terminal is a logic 0.

Outputs from the gates 49, 54, 55 are applied to the gate 50, the output of which is applied to the set steering terminal of the check error flip-flop. If any error is present, from any of the comparison circuits, a logic 1 is applied to the gate 50 to produce a logic 0 at the set steering terminal of the check error flip-flop. This provides set steering for the flip-flop and on the next clock signal, this flip-flop becomes set. Normally this flip-flop is reset through the closed contacts M0TR. These contacts are the machine operator's test relay which are opened when the checking circuit is to be used. When the contacts M0TR are opened, the check error flip-flop may be set. When the check error flip-flop is set by an error signal at its set steering terminal and a clock signal, its zero terminal applies a logic 0 to the gate 56 along with the logic 0 from the source of plus six volts. The gate 56 produces a logic 1 error signal which indicates that an error has been detected.

Checking circuit—Operation

Figure 3:
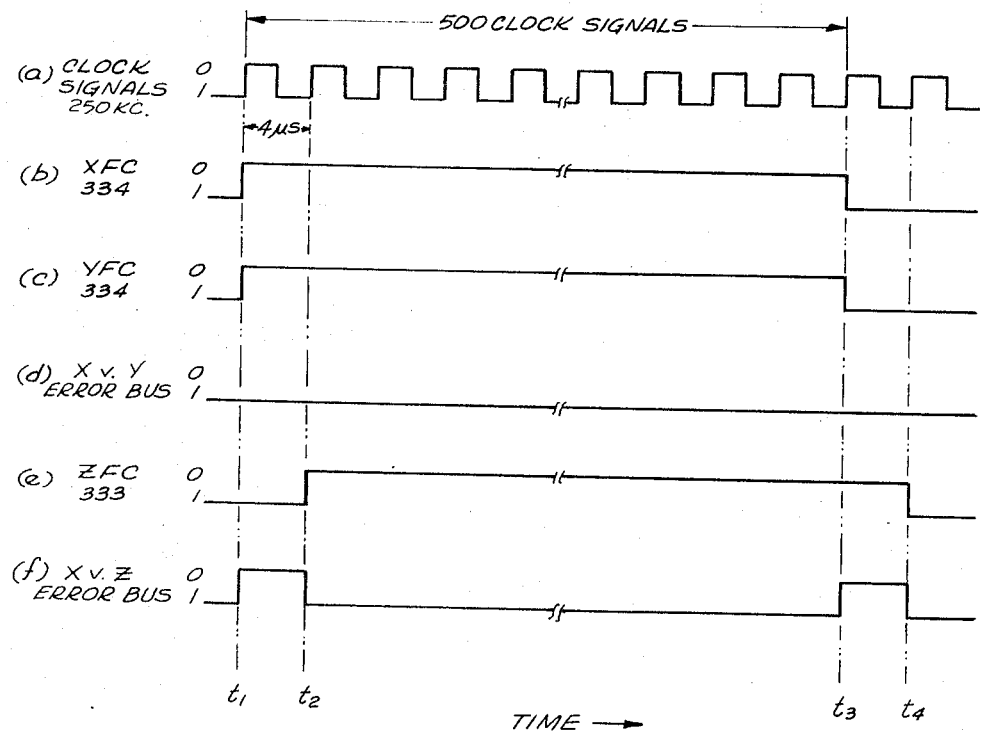
FIGURE 3 shows waveforms for explaining the operation of the checking circuit of the invention.

The operation of the checking circuit will be explained in connection with several examples illustrated by the waveforms shown in FIGURE 3. In FIGURE 3, all the waveforms are plotted against a common time axis. FIGURE 3a shows the clock signals produced by the timing generator 17 of FIGURE 1, these clock signals being square wave signals which vary at a 250 kilocycle rate between a logic 1 and a logic 0. FIGURE 3b shows a signal derived from the X axis fine command phase generator. FIGURE 3c shows a signal derived from the Y axis fine command phase generator. FIGURE 3d shows the output of the X versus Y comparison error bus.

FIGURE 3e shows a signal derived from the Z axis fine command phase generator. And FIGURE 3f shows the output of the X versus Z comparison error bus.

Before a check is made, the check time active flip-flop has been reset by a trigger signal derived from the clock signals. Its zero terminal is at a logic 1, and its one terminal is at a logic 0 so that this flip-flop has set steering. When a check is to be made, a code of 20, 21, or 22 is supplied. In response to the ten value of 2, a discriminator blanking signal is applied to the set trigger terminal of the check time active flip-flop to set this flip-flop. At the same time, an inverted numerical positioning check command signal of logic 0 is applied to the gate 40. With the check time active flip-flop set, both inputs of the gate 40 are at a logic 0 and it produces a logic 1. This logic 1 is inverted by the inverter 41 to a logic 0 so that the code bus 20 is at a logic 0 to the gates 49, 54, 55. For an X versus Y comparison, check code 20 is supplied. This check code 20 resets the auxiliary function flip-flops having unit values of 1, 2, 4, and 8. Therefore the lower four inputs of the gate 49 are supplied with a logic 0. Then, a series of fine, medium, and coarse command signals are applied to the X and Y command phase counters. The number of command signals so applied depends upon the checks of the phase generators which must be made. For example, the number 334 may have particular significance in terms of introducing or finding trouble or a fault in the system. If the X and Y command phase generators are functioning properly, their outputs will have the same phase or will vary at the same points in time. This is exemplified by the X fine command signal of FIGURE 3b and the Y fine command signal of FIGURE 3c. It is to be understood that the medium and coarse commands are also producing signals and are also being compared at the same time. At the time $t_1$, the X fine command signal goes from a logic 1 to a logic 0 and the Y fine command goes from a logic 1 to a logic 0 also. The inverted X and Y fine commands go from a logic 0 to a logic 1 at this time $t_1$ also. Thus, the gate 42 has a logic 0 applied to its input by the X fine command and a logic 1 applied to it by the inverted Y fine command. The gate 43 has a logic 1 applied to its input by the inverted X fine command and a logic 0 applied to its input by the Y fine command. One of the inputs (i.e., $\overline{YFC}$) to the gate 42 is at a logic 1, and one of the inputs (i.e., $\overline{XFC}$) to the gate 43 (i.e., the input $\overline{XFC}$) is at a logic 1 also. Therefore the gates 42, 43 both produce a logic 0 at their outputs. If the medium and coarse commands are in proper phase or time relationship, the gates 44, 45, 46, 47 likewise produce a logic 0 at their outputs. With all the inputs of the gate 48 at a logic 0, indicating proper phase relationships of the signals, the gate 48 produces a logic 1 on the X versus Y error bus as shown in FIGURE 3d. This logic 1 causes the gate 49 to produce a logic 0 at its output. If the other comparison circuits, namely the X versus Z and X versus PFR, have signals applied to them which are in the proper phase or time relationships, the gates 54, 55 likewise produce a logic 0 at their respective outputs. Thus, the gate 50 has all its inputs at a logic 0 and produces a logic 1 at its output. This logic 1 is applied to the set steering terminal of the check error flip-flop and is the incorrect logic value and prevents this flip-flop from becoming set by a clock signal. When both the command signals return to logic 1 at time $t_3$, no error signal is produced.

If, however, one of the inputs to the gate 50 is at a logic 1, indicating an error in one of the comparison circuits, then the gate 50 produces a logic 0 at its output which provides set steering for the check error flip-flop. The next clock signal at the set trigger input of the check error flip-flop sets this flip-flop and a logic 0 is applied to the gate 56. The gate 56, if the relay contacts are open, produces a logic 1 error signal which indicates to the operator that an error in the signal has occurred or taken place. FIGURE 3 shows the conditions in a comparison which would produce an error signal. If, in the X versus Z comparison, the Z axis fine command phase generator produced a signal of 333 instead of 334, as shown in FIGURE 3e, this signal would vary from a logic 1 to a logic 0 at the time $t_2$ instead of the time $t_1$ as it should. Thus, for the X versus Z comparison, the X fine command signal is at a logic 0 between the times $t_1$ and $t_2$, while the Z fine command signal is at a logic 1 between the times $t_1$ and $t_2$. During this interval, both inputs (XFC and $\overline{ZFC}$) to the gate 57 are at a logic 0, while both inputs ($\overline{XFC}$ and ZFC) to the gate 58 are at a logic 1. The gate 57 produces a logic 1 at its output which, when applied to the gate 50, causes a logic 0 to be produced on the X versus Z error bus. With the check code 21 being applied, the auxiliary function flip-flop having a unit value of 1 is set and its inverted output is at a logic 0. Therefore, all inputs to the gate 54 are at a logic 0 and the gate 54 produces a logic 1 which is applied to the gate 50. This causes the gate 50 to produce a logic 0 set steering for the check error flip-flop. On the next clock pulse, an error will be indicated. At the interval between times $t_3$ and $t_4$, another error will be indicated. This is shown in FIGURE 3f.

In addition to checking commanded position, the checking circuit of the invention can also check commands of pulse feed rate, or any other command which has a variation at a particular time. In addition, any number of commands may be compared simultaneously as indicated by the X versus Y comparison of fine, medium, and coarse command signals as opposed to the X versus PFR comparison of only an X command and pulse feed rate command signal. Any two or more signals may be compared at the same time in accordance with the invention, and any number of such comparisons may be combined by appropriate logic gates of the requisite number of inputs. And, any sort of code to make a comparison operable can be used. Thus, the check code 20 may be applied so that only an X versus Y comparison takes place, or a check code 20 and 21 may be simultaneously used to provide a simultaneous X versus Y and X versus Z comparison, or a check code 20, a check code 21, and a check code 22 may be provided for three simultaneous comparisons. In one practical embodiment, it was found that simultaneous comparisons of all signals could be used first, and if an error were indicated, then individual comparisons could be made to localize the error. It will thus be seen that the check circuit provides a new and improved system for checking signals whose phase or whose time variations must occur at a predetermined time. While the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. In a system wherein a command is represented by a plurality of binary coded command signals that vary in their binary characteristic at a time determined by said command, a circuit for checking said time of variations of said command signals comprising a first gating means for comparing the time of binary variation of a first command signal with the time of binary variation of the inversion of a second command signal, said first gating means producing a binary signal output only when there is a time difference in variation of said two signals, a second gating means for comparing the time of binary variation of the inversion of said first command signal with the time of binary variation of said second command signal, said second gating means producing a binary output only when there is a time difference in variation of said two signals, and means coupled to the outputs of said first and second gating means for producing a binary output signal whenever a binary output signal is produced at the output of either of said first and second gating means.

2. In a system wherein a command is represented by a plurality of binary coded command signals that vary in their binary characteristic at a time determined by said command, a circuit for checking said time of variations of said command signals comprising a first circuit for comparing the time of binary variation of a first command signal with the time of binary variation of the inversion of a second command signal and producing an error signal in response to a time difference in variation of said two signals, a second circuit for comparing the time of binary variation of the inversion of said first command signal with the time of binary variation of said second command signal and producing an error signal in response to a time difference in variation of said two signals, a third circuit for comparing the time of binary variation of said first command signal with the time of binary variation of the inversion of a third command signal and producing an error signal in response to a time difference in variation of said two signals, a fourth circuit for comparing the time of binary variation of said inversion of said first command signal with the time of binary variation of said third command signal and producing an error signal in response to a time difference in variation of said two signals, and means coupled to said four circuits and activated by a checking signal for producing an output signal in response to an error signal from any one of said four circuits.

3. In a system wherein a command is represented by first and second binary coded X command signals that vary in their binary characteristic at a time determined by said X command, and wherein a command is further represented by first and second binary coded Y command signals that vary in their binary characteristic at a time determined by said Y command, a circuit for checking said time of variations of said command signals comprising a first circuit for comparing the time of binary variation of said first X command signal with the time of binary variation of the inversion of said first Y command signal and producing an error signal in response to a time difference in variation of said two signals, a second circuit for comparing the time of binary variation of the inversion of said first X command sginal with the time of binary variation of said first Y command signal and producing an error signal in response to a time difference in variation of said two signals, a third circuit for comparing the time of binary variation of said second X command signal with the time of binary variation of the inversion of said second Y command signal and producing an error signal in response to a time difference in variation of said two signals, a fourth circuit for comparing the time of binary variation of the inversion of said second X command signal with the time of binary variation of said second Y command signal and producing an error signal in response to a time difference in variation of said two signals, and means coupled to said four circuits and activated by a checking signal for producing an output signal in response to an error signal from any one of said four circuits.

References Cited by the Examiner

UNITED STATES PATENTS

| | | | |
|---|---|---|---|
| 2,933,682 | 4/1960 | Moulton et al. | 324—82 X |
| 2,985,773 | 5/1961 | Dobbie | 324—79 X |
| 2,988,696 | 6/1961 | Pihl | 324—83 |
| 3,016,517 | 6/1962 | Saltzberg | 324—83 X |
| 3,209,254 | 9/1965 | Hossmann | 324—83 |

WALTER L. CARLSON, *Primary Examiner.*

RUDOLPH V. ROLINEC, *Examiner.*

A. E. RICHMOND, *Assistant Examiner.*